United States Patent
Bhajak et al.

(10) Patent No.: US 9,579,009 B2
(45) Date of Patent: Feb. 28, 2017

(54) DISHWASHER WITH VERTICALLY ADJUSTABLE DISH RACK

(71) Applicant: Whirlpool Corporation, Benton Harbor, MI (US)

(72) Inventors: Harshal J. Bhajak, Pune (IN); Kevin T. Kutto, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 873 days.

(21) Appl. No.: 13/758,121

(22) Filed: Feb. 4, 2013

(65) Prior Publication Data

US 2014/0217868 A1  Aug. 7, 2014

(51) Int. Cl.
*A47L 15/50* (2006.01)
*B23P 19/00* (2006.01)

(52) U.S. Cl.
CPC ............. *A47L 15/50* (2013.01); *A47L 15/504* (2013.01); *B23P 19/00* (2013.01); *Y10T 29/49826* (2015.01)

(58) Field of Classification Search
CPC ........ A47L 15/50; A47L 15/504; B23P 19/00; Y10T 29/49826
USPC .................................... 134/56 D, 57 D, 58 D
See application file for complete search history.

(56) References Cited

U.S. PATENT DOCUMENTS

| | | |
|---|---|---|
| 3,726,581 A | 4/1973 | Doepke |
| 3,736,037 A | 5/1973 | Doepke |
| 5,474,378 A | 12/1995 | Smith et al. |
| 5,595,200 A | 1/1997 | Favaro |
| 5,657,878 A | 8/1997 | Austin |
| 5,860,716 A | 1/1999 | Good et al. |
| 7,168,578 B2 | 1/2007 | Mersch et al. |
| 7,410,228 B2 | 8/2008 | Dickson et al. |
| 7,418,967 B2 | 9/2008 | Kim |
| 7,651,180 B2 | 1/2010 | Deiss et al. |
| 7,775,378 B2 | 8/2010 | Tynes et al. |
| 8,192,557 B2 | 6/2012 | Ryu et al. |
| 2006/0237042 A1 | 10/2006 | Weaver et al. |
| 2008/0272072 A1* | 11/2008 | Tynes ............... A47L 15/504 211/41.8 |

(Continued)

FOREIGN PATENT DOCUMENTS

| | | |
|---|---|---|
| EP | 0033483 A2 | 8/1981 |
| EP | 0848930 A2 | 6/1998 |

(Continued)

*Primary Examiner* — Jason Ko
*Assistant Examiner* — Levon J Shahinian

(57) ABSTRACT

A dish rack is supported for vertical movement relative to a dishwasher tub between lowered and raised positions. To raise the rack, spring biased locking levers provided on side walls of the dish rack are pivoted to cause wing members of the locking levers to release locking tabs, extending in a cantilevered fashion from locking straps secured to the rack, from locking openings provided in adjuster arms which are fixed vertically relative to the tub, thereby disengaging the locking straps from the adjuster arms to enable the rack to be lifted to the raised position. To lower the rack, the locking levers are again pivoted to reposition support members of the locking straps into positions offset from the adjuster arms, thereby enabling the rack to be guided to the lowered position where the locking tabs automatically engage the adjuster arms.

14 Claims, 7 Drawing Sheets

(56) References Cited

U.S. PATENT DOCUMENTS

2011/0018410 A1   1/2011  Bastuji et al.
2012/0082507 A1   4/2012  Wong et al.

FOREIGN PATENT DOCUMENTS

| EP | 1166708 A2 | 1/2002 |
|---|---|---|
| EP | 1854394 A1 | 11/2007 |
| KR | 101053609 B1 | 7/2011 |

* cited by examiner

DISHWASHER WITH VERTICALLY ADJUSTABLE DISH RACK

BACKGROUND OF THE INVENTION

Field of the Invention

The present invention pertains to the art of dishwashers and, more particularly, to a vertically adjustable dishwasher dish rack arrangement.

Description of the Related Art

A front loading dishwasher typically includes a tub having an open front. The tub defines a washing chamber into which items, such as kitchenware, glassware and the like, are placed to undergo a washing operation. The dishwasher is generally provided with a door, pivotally mounted to the tub, that closes the open front, and upper and lower extensible dish racks for supporting items during the washing operation. Typically, the upper and lower dish racks are separated by a defined vertical spacing that limits the overall size of items that can be placed in the dishwasher.

In order to provide more flexibility to consumers, manufacturers have developed adjustment mechanisms that enable at least one dish rack to be vertically adjustable. Most commonly, the upper dish rack can be vertically shifted to increase the defined vertical spacing between the upper and lower dish racks. Typically, the adjustment mechanisms are mounted on opposing sides of the dish rack and connect to extensible support rails that permit the dish rack to move in and out of the washing chamber. In many cases, the adjustment mechanisms have complicated structure, can be difficult to operate in transitioning from one height position to another, are unstable and/or are simply not reliable.

Based on the above, there is still seen to exist a need in the art for an advantageously designed, stable and reliable vertical height adjustment system for a dishwasher dish rack.

SUMMARY OF THE INVENTION

The present invention is generally directed to a dishwasher including a tub that defines a washing chamber and a dish rack for supporting items to be washed in the washing chamber. In accordance with the invention, the dish rack is provided with an adjustment system that enables the dish rack to be vertically shifted between raised and lowered positions. Overall, the dishwasher can take various forms, including a drawer dishwasher including an internal washing chamber or a dishwasher including a door pivotally mounted relative to the tub for sealing a washing chamber during washing operations. In the latter case, the dish rack is mounted to horizontally extensible support rail members that permit the dish rack to be shifted in and out of the washing chamber for loading/unloading purposes. In either case, the adjustment system includes first and second height adjustment mechanisms provided along the side walls of the dish rack for vertically shifting the dish rack between lowered and raised positions relative to the tub.

Each of the first and second height adjustment mechanisms includes a thumb-press adjuster system for vertically shifting the dish rack relative to the tub through two-way activation. On each side of the rack, an adjuster arm is fixed vertically relative to the rack, while also being provided with channels within which vertical side wall elements of the rack are slidably received. The adjuster arm includes a pair of spaced central locking slots, as well as fore and aft guide pockets each of which slidably receives a respective spaced leg extending from a locking strap attached to the rack. In this manner, the adjuster arm guides the locking strap and rack for relative vertical movement. A pair of cantilevered locking tabs depend from the locking strap in alignment with the locking slots. A central portion of a locking lever is pivotally mounted to the rack, with an upper portion of the locking lever defining a thumb engaging portion or region and a lower portion including at least one support member. Below the central portion, the locking lever is provided with a pair of fore-to-aft spaced wing members, each of which extends between the adjuster arm and a respective one of the locking tabs.

In a lowered position of the vertically adjustable rack, the locking tabs are received in the locking slots, thereby fixing the locking strap to the adjuster arm. The locking lever is actually biased into a locking position. By pressing the thumb engaging regions, each locking lever can be pivoted against the biasing force, thereby shifting the wing members and causing the locking tabs to withdraw from the locking slots, thus permitting vertical adjustment of the rack. Upon reaching a raised position for the rack, the support member of the locking lever rests upon the adjuster arm, thereby preventing the rack from being lowered until the thumb engaging regions are again pressed.

With this arrangement, a dish rack can be readily repositioned between at least raised and lowered positions in an effective and reliable manner. Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
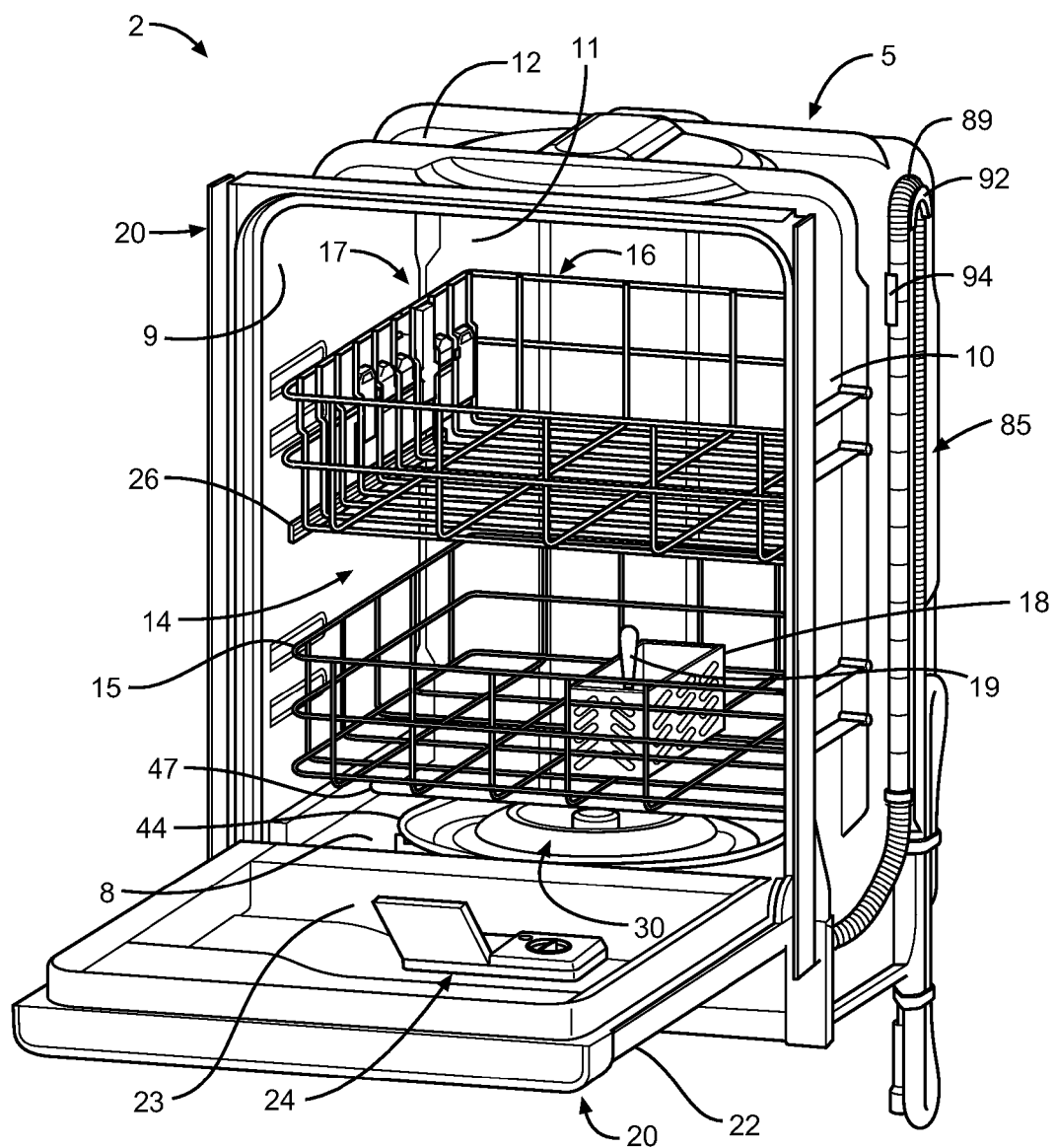
FIG. 1 is a perspective view of a dishwasher incorporating a dish rack having a vertical height adjustment mechanism constructed in accordance with the present invention.

With initial reference to FIG. 1, a dishwasher constructed in accordance with the present invention is generally indicated at 2. As shown, dishwasher 2 includes a tub 5, which is preferably injection molded of plastic, so as to include integral bottom, side, rear and top walls 8-12 respectively. Within the confines of walls 8-12, tub 5 defines a washing chamber 14 within which soiled kitchenware is adapted to be placed on a lower dish rack 15 and/or an adjustable upper dish rack 16 which, as will be detailed more fully below, includes a vertical adjustment system employing opposing side adjustment mechanisms 17 for vertically shifting dish rack 16 between a first or lowered position and a second or raised position. As shown in this figure, a utensil basket 18, which contains a utensil 19, is positioned within lower rack 15. Tub 5 has associated therewith a pivotally supported door 20 used to seal washing chamber 14 during a washing operation. Door 20 has an exterior panel 22 and an interior panel 23 preferably provided with a dispensing assembly 24 within which a consumer can place liquid, particulate or gel washing detergent for dispensing at predetermined periods of the washing operation.

In a manner known in the art, upper dish rack 16 is horizontally shiftable between a first position wherein upper dish rack 16 is entirely within the confines of washing chamber 14 and a second position, wherein upper dish rack 16 extends, at least partially outward, from washing chamber 14. Toward that end, dishwasher 2 is provided with extensible support rails, one of which is indicated generally at 26. In a similar manner, lower dish rack 15 is selectively, horizontally shiftable between first and second positions. However, when in the second position, lower dish rack 15 rests upon an open door 20 on guide elements (not separately labeled) formed on interior panel 23.

Disposed within tub 5 and, more specifically, mounted within a central opening formed in bottom wall 8 of tub 5, is a pump and filter assembly 30. Extending about a substantial portion of pump and filter assembly 30, at a position raised above bottom wall 8, is a heating element 44. In a manner known in the art, heating element 44 preferably takes the form of a sheathed, electric resistance-type heating element. In general, pump and filter assembly 30 is adapted to direct washing fluid to a lower wash arm 47 and at least one upper wash arm (not shown). Dishwasher 2 has associated therewith a drain hose 85 including at least one corrugated or otherwise curved portion 89 that extends about an arcuate hanger 92 provided on an outside surface of side wall 10. Drain hose 85 is shown secured to tub 5 through various clips, such as that indicated at 94. In any event, in this manner, an upper loop is maintained in drain hose 85 to assure proper drainage in a manner known in the art. As the exact structure and operation of pump and filter assembly 30 of dishwasher 2 is not part of the present invention, it will not be discussed further herein. Instead, the present invention is directed to particulars of height adjustment mechanism 17. However, at this point it should be noted that the invention can be employed in connection with adjusting the height of dish racks in various types of dishwashers, including the more conventional type shown in FIG. 1 and drawer dishwashers. Of course, with drawer dishwashers, the dish rack would not be extensible, but still the dish rack could be vertically adjustable.

Figure 2:
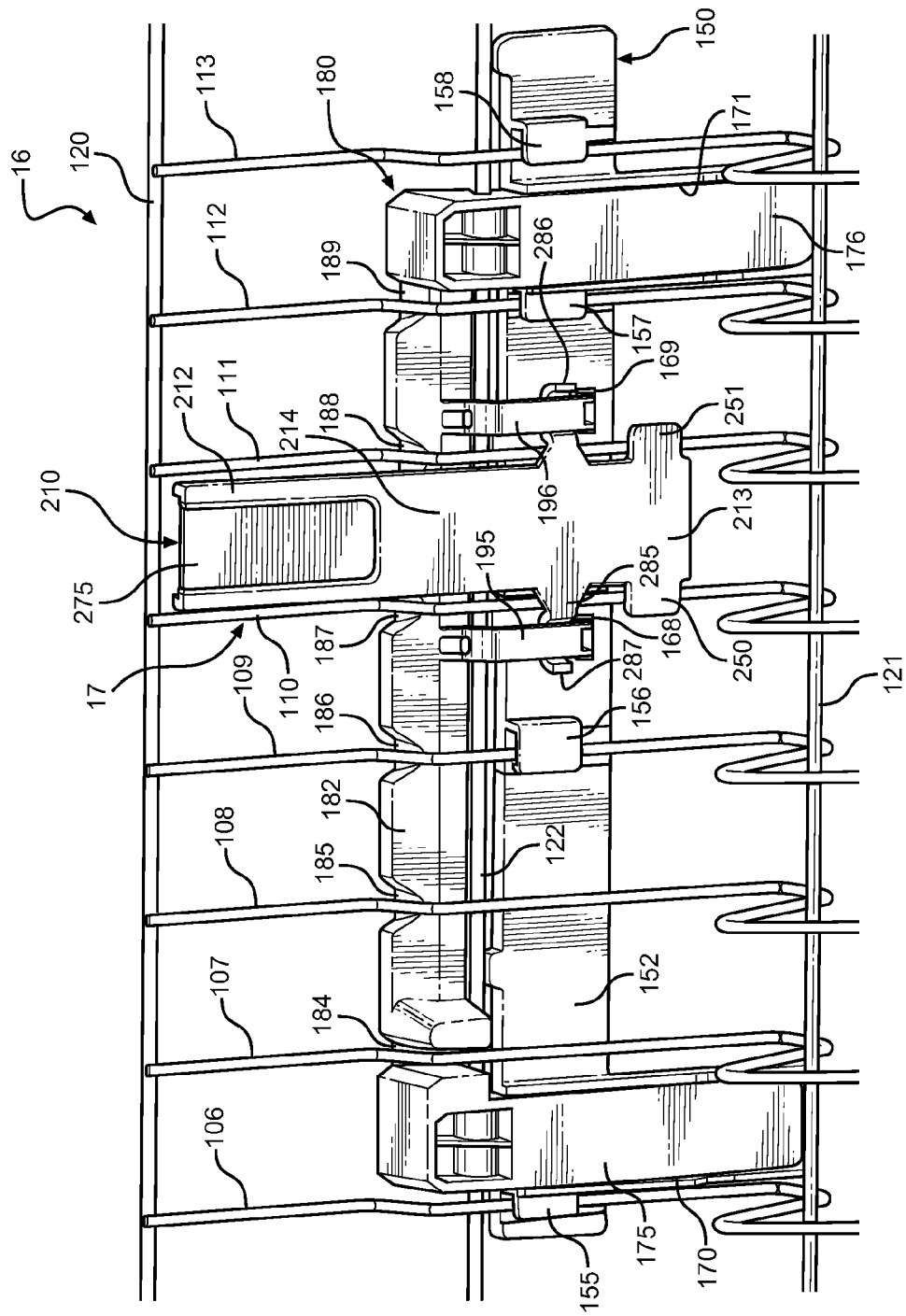
FIG. 2 is a perspective view of an inner side portion of the dish rack with the height adjustment mechanism from the dishwasher of FIG. 1 shown in a lowered position.
Figure 3:
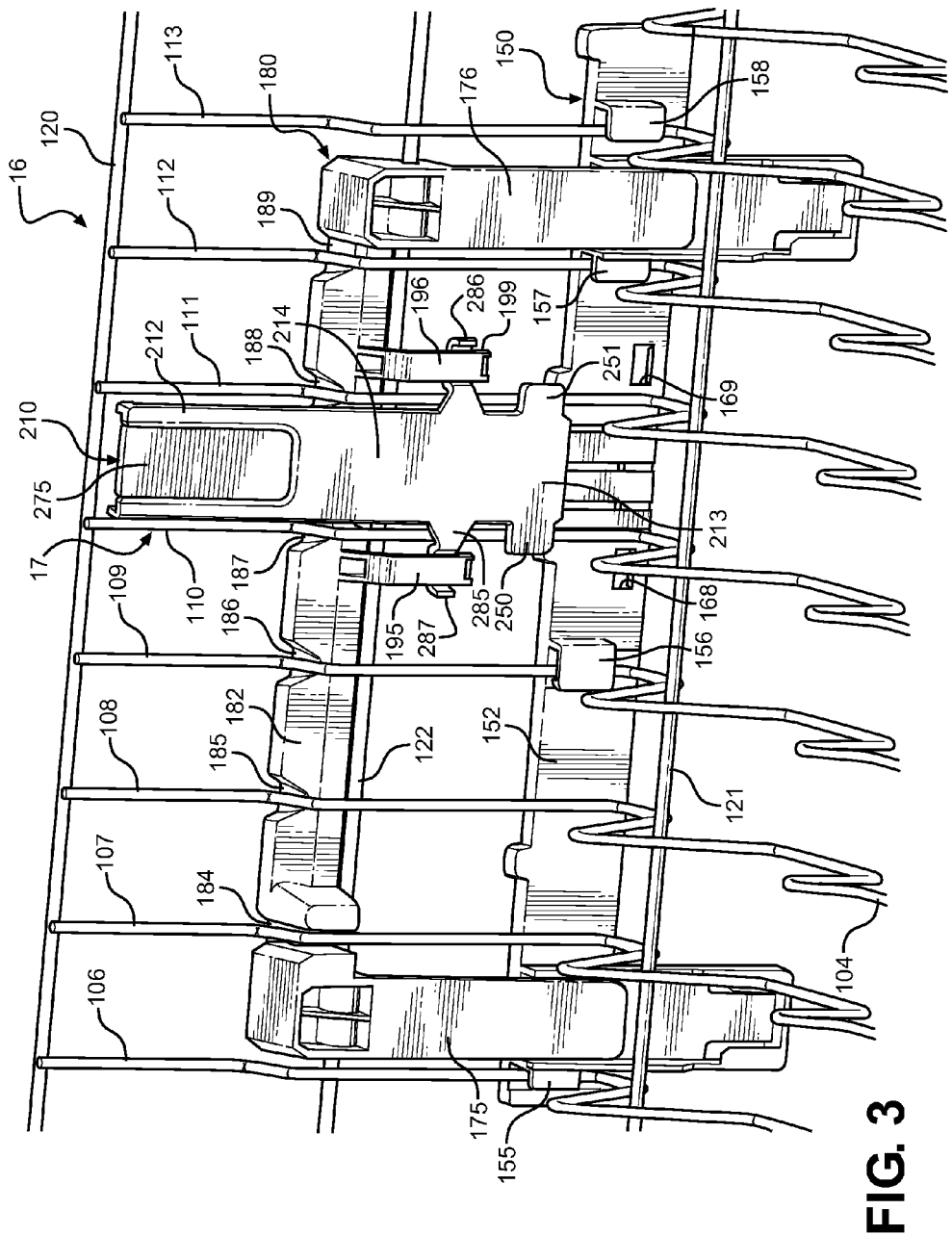
FIG. 3 is a perspective view of the inner side portion of the dish rack with the height adjustment mechanism from the dishwasher of FIG. 1 shown in a raised position.
Figure 4:
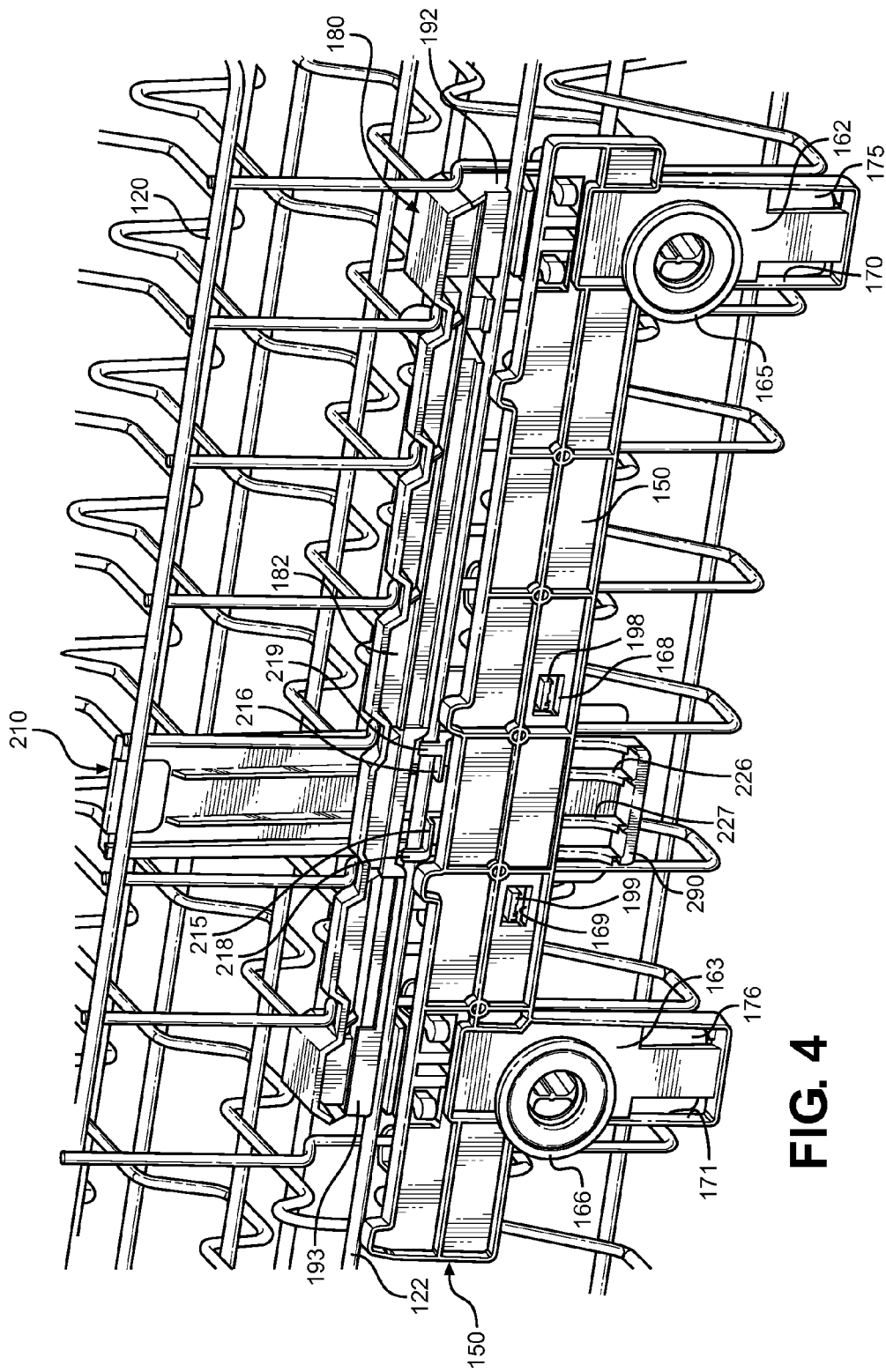
FIG. 4 is a perspective view of an outer side portion of the dish rack with the height adjustment mechanism from the dishwasher of FIG. 1.

Reference will now be made to FIGS. 2-4 in describing the particular details of each height adjustment mechanism 17 and its connection to rack 16. In the exemplary embodiment shown, rack 16 is formed of interconnected wires so as to define a plurality of generally horizontal or bottom rails, such as indicated at 104, which extend up and define generally vertical, opposing side rails, such as 106-113. Also shown is an upper peripheral rim rail 120, a lower peripheral rail 121, and an intermediate peripheral rail 122. As represented these figures, bottom rails 104 have portions thereof which define multiple levels for rack 16 and are formed with various raised rail portions, such as that indicated at 125, to more readily support various kitchenware items in a manner known in the art. In general, the particular construction and design of rack 16 can greatly vary in accordance with the invention and is known in the art.

Height adjustment mechanism 17 of the invention is shown to include an adjuster arm 150 having a main body portion 152 including, at spaced fore-to-aft locations, a plurality of channel defining members 155-158. Channel defining members 155-158 slidably receive respective vertical side rails 106, 109, 112 and 113 respectively. In this manner, rack 16 is guided for vertical movement relative to each adjuster arm 150. In connection with the embodiment shown wherein rack 16 is also mounted for sliding movement relative to tub 5, adjuster arm 150 includes mounting arms 162 and 163 (see FIG. 4) for rotatably supporting a pair of fore-aft-spaced wheels 165 and 166 which interact with a respective extensible support rail 26 carried by tub 5 in order to enable rack 16 to be shifted into and out of washing chamber 14. At this point, it is important to note that adjuster arm 150 is vertically fixed relative to tub 5, which in this embodiment is due to the connection with support rail 26, and rack 16 can shift vertically relative to adjuster arm 150 between at least a lowered position as shown in FIG. 2 and a raised position as shown in FIG. 3. In addition, it should be noted that adjuster arm 150 is formed with a pair of locking slots or openings 168 and 169, shown intermediate channel defining members 156 and 157.

Adjuster arm 150 also includes a pair of fore-to-aft spaced guide pockets 170 and 171 defined, at least in part, by mounting arms 162 and 163. Each guide pocket 170, 171 slidably receives a respective leg 175, 176 extending substantially vertically at spaced fore-to-aft terminal locations from a locking strap 180. Locking strap 180 includes a main body portion 182 which is shown to extend substantially horizontally along rack 16 and includes notched zones 184-189 which receive bent portions (not separately labeled) of side rails 107-112 of rack 16. At this point, it should be recognized that locking strap 180 can be fixed to rack 16 in many different ways. In accordance with the embodiment depicted, locking strap 180 is snap-mounted onto intermediate peripheral rail 122 through split connectors 192 and 193 (particularly see FIG. 4). Regardless of the particular mounting arrangement employed, it is important to recognize that locking strap 180 is connected for concurrent vertical movement with rack 16. Also shown projecting from main body portion 182 of locking strap 180 is a pair of locking tabs 195 and 196. More specifically, each locking tab 195, 196 extends substantially vertically in a cantilevered manner from main body portion 182 and terminates in a laterally outwardly projecting catch member 198, 199 (particularly see FIG. 4).

Figure 5:
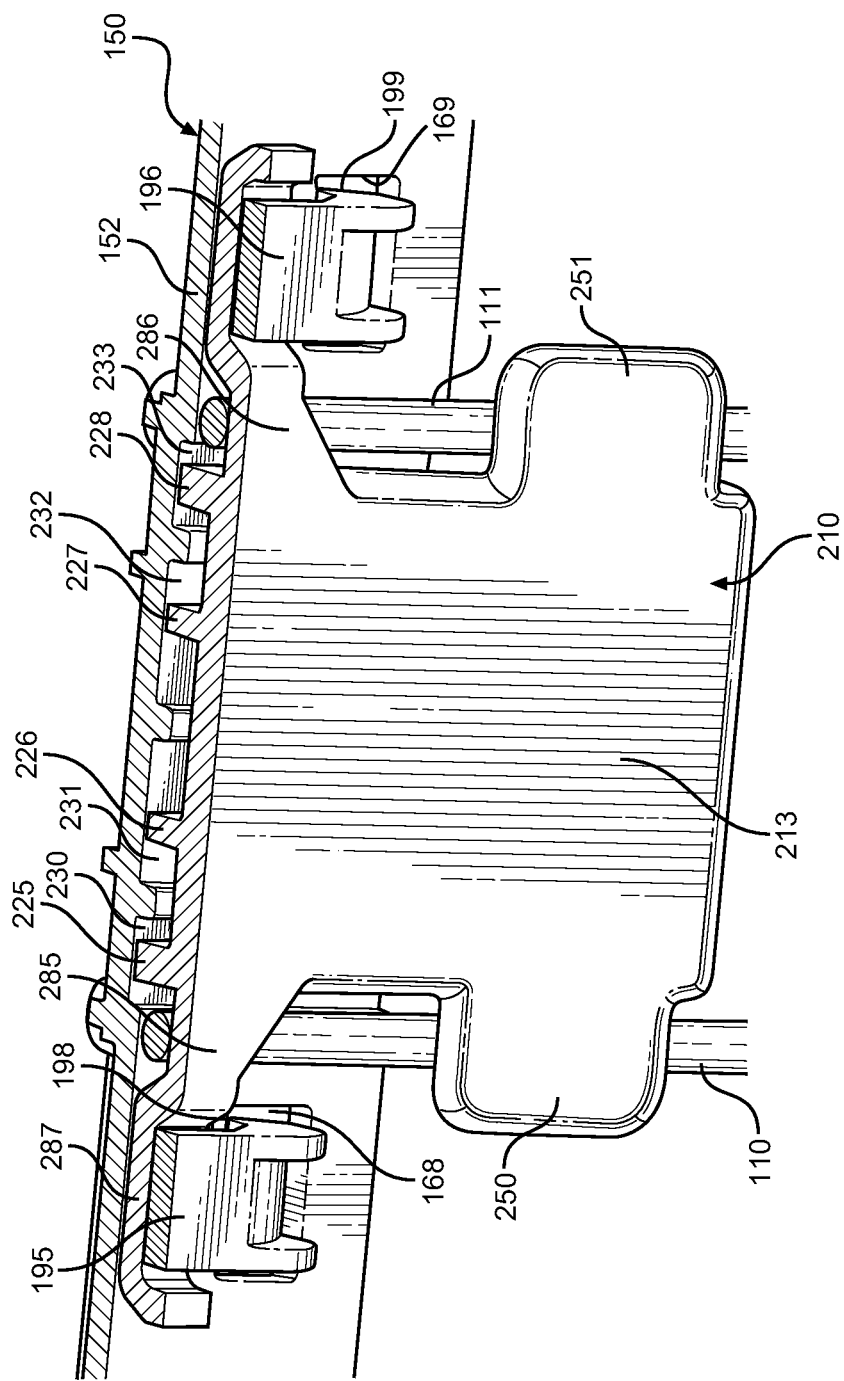
FIG. 5 is a partial, cross-sectional view of a latch release arrangement employed in the height adjustment mechanisms of FIG. 1.

In addition to the above structure, each adjustment mechanism 17 also includes a locking lever 210 having an upper portion 212, a lower portion 213 and an intermediate or central portion 214. Locking lever 210 is pivotally attached to and mounted for concurrent movement with rack 16. In the embodiment shown, locking lever 210 is directly pivotally attached to intermediate peripheral rail 122. More specifically, as best depicted in FIG. 4, a laterally outward side of locking lever 210 is formed with at least one projection 215, 216 which establishes a ledge from which extends a pair of upstanding flanges 218 and 219. Intermediate peripheral rail 122 is captured behind flanges 218 and 219, while generally resting on the ledge so as to define a pivot axis for locking lever 210. At the same time, the outward side of locking lever 210 is formed with various spaced ribs 225-228 which align with channels 230-233 formed in main body portion 182 of locking strap 180 (see FIG. 5). In this manner, locking lever 210 is both supported for pivotal movement and retained against any significant fore-to-aft movement.

Locking lever 210 is preferably biased such that the lower portion 213 is forced laterally outwardly. To limit movement of locking lever 210 based on this biasing force, the lower portion 213 is provided with a pair of stop abutment members 250 and 251 which engage rails 110 and 111 respectively. In accordance with the invention, the biasing can be performed in various ways. For instance, one or more torsion springs could be provided, such as about intermediate rail 122 defining the pivot axis. However, in one embodiment depicted in FIG. 6, the biasing is performed by forming the locking lever 210 with a rear, cantilevered plate 260 have an upper free end provided with ear members, one of which is shown at 265, which abut rails 110 and 111. With this arrangement, stop abutment members 250 and 251 are biased into a position engaging rails 110 and 111, but locking lever 210 can be selectively rotated about the pivot axis defined by intermediate rail 122 relative to rack 16 against this biasing force. As will be detailed more fully below, upper portion 212 of each locking lever 210 is provided with a thumb engaging region 275 for this purpose. However, prior to discussing the operation of adjustment mechanism 17, reference is made to the inclusion of wing members 285 and 286 which respectively project rearward and forward (fore and aft) from the intermediate portion 214 of locking lever 210. Each wing member 285, 286 includes a terminal cup member 287 which is interposed between main body portion 152 of adjuster arm 150 and a respective one of the cantilevered locking tabs 195, 196 at a position spaced from a corresponding catch member 198, 199. Finally, locking lever 210 is provided with a support member 290 projecting laterally from lower portion 213 as best shown in FIG. 4.

With the inclusion of the adjustment system of the invention, dish rack 16 can be effectively and reliably shifted between the lower position shown in FIG. 2 and the raised position shown in FIG. 3. More specifically, to raise dish rack 16, a user need simply engage the upper portions 212 of locking levers 210, such as by pressing thumb engaging portions 275, to cause pivoting of locking levers 210 about the pivot axis defined by intermediate rail 122 at central portion 214 against the biasing force caused by ear members 265 of rear plate 260 engaging rails 110 and 111. Pivoting each locking lever 210 causes wing members 285 and 286 to deflect locking tabs 195 and 196 so as to shift catch members 198 and 199 from within locking openings 168 and 169. At this point, rack 16 can be lifted vertically, with legs 175 and 176 being guided in guide pockets 170 and 171. At the same time, rack 16 is also guided by rails 106, 109, 112 and 113 sliding relative to channel defining members 155-158. When dish rack 16 reaches the raised position, which is prior to bottom rails 104 reaching the channel defining members 155-158, the support member 290 on each adjustment mechanism 17 will be located vertically above a respective adjuster arm 150. The release of locking levers 210 enables dish rack 16 to be supported upon adjuster arms 150 as illustrated in FIG. 3, with each support member 290 sitting directly upon a respective adjuster arm 150 and stop abutment members 250 and 251 preventing pivoting of locking lever 210 in one direction. A similar operation is performed to selectively reposition dish rack 16 back to the lowered position of FIG. 2 by again pivoting locking levers 210 through thumb engaging portions 275 to reposition support members 290 offset from adjuster arms 150 thereby enabling dish rack 16 to be guided to the lowered position whereat catch members 198 and 199 can automatically snap or otherwise extend back into locking openings 168 and 169 while stop abutment members 250 and 251 engage rails 110 and 111 respectively.

Figure 6:
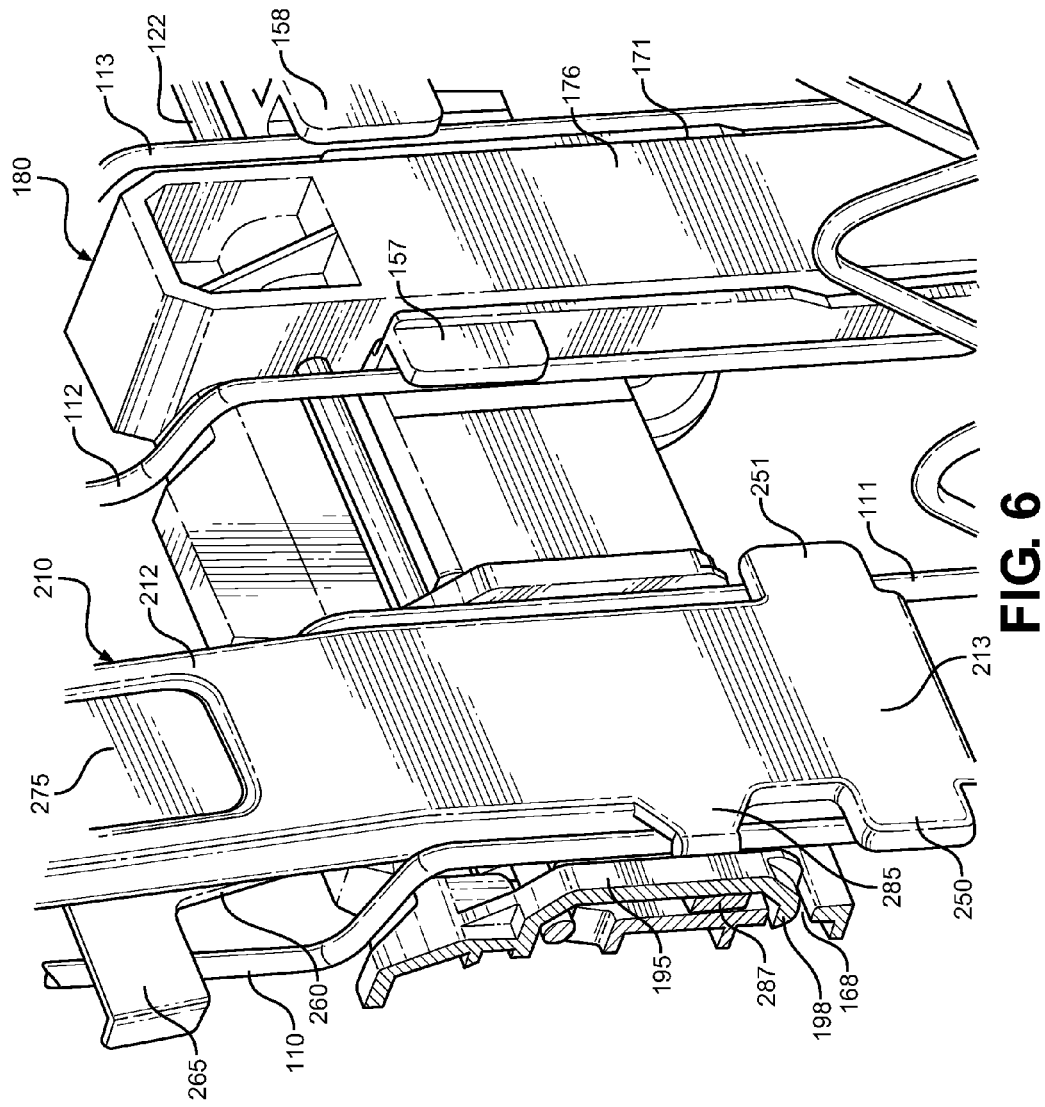
FIG. 6 is a perspective view similar to FIG. 2, but illustrating an inner side portion of the dish rack with a modified version of the height adjustment mechanism.
Figure 7:
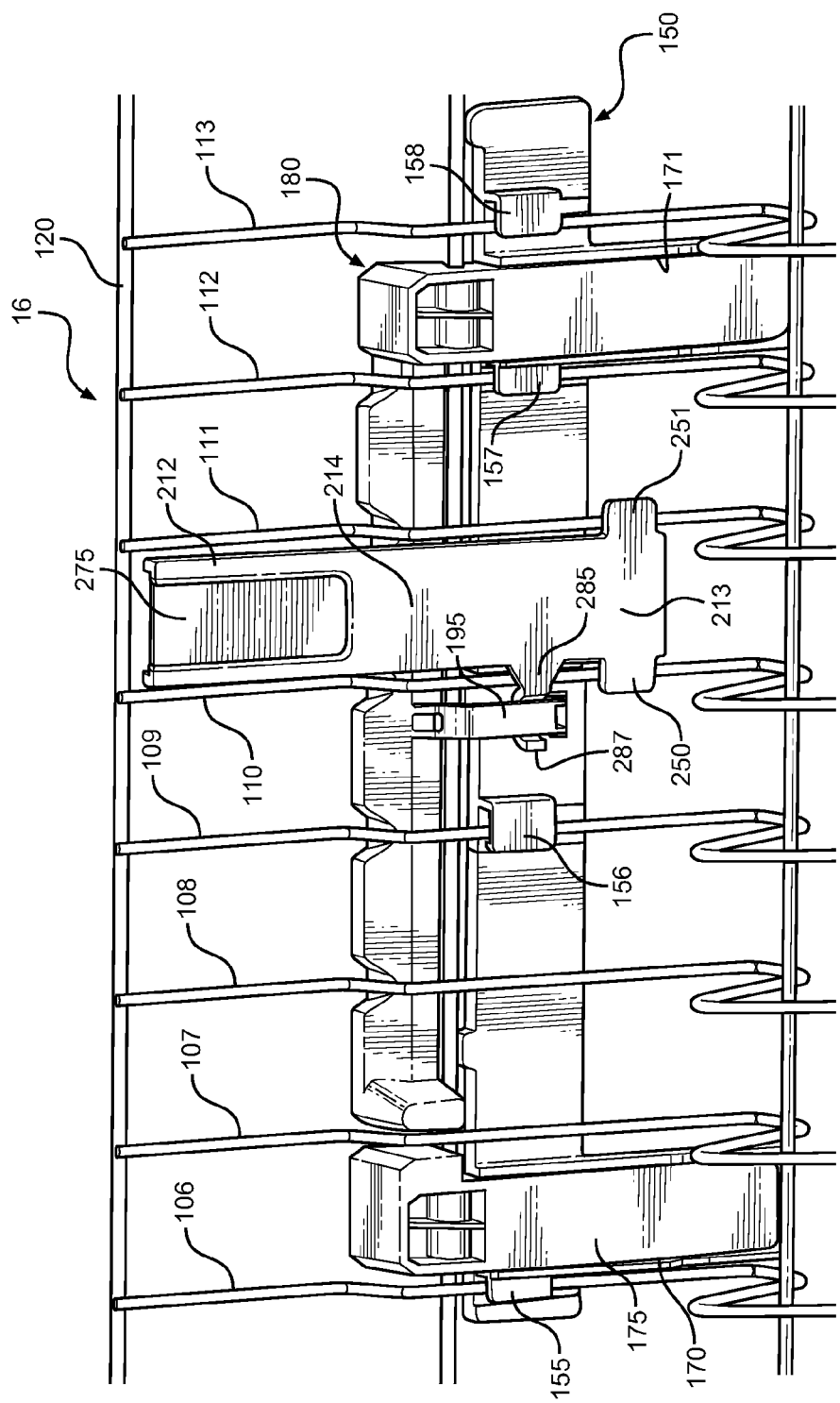
FIG. 7 is a partial cross-sectional view of a latch release arrangement employed in the modified height adjustment mechanism of FIG. 6.

In accordance with the present invention, the particular number of locking tabs, as well as the corresponding locking openings and wing members, can vary. To this end, FIGS. 6 and 7 depict an embodiment exhibiting all the same structure to that described above but wherein only a single catch member 198 for a single locking tab 195 is used in conjunction with an adjuster arm having a single locking opening 168 and a locking lever having a single wing member 285. As the raising/lowering operation of this embodiment is essentially identical to that described above in detail, the operation description will not be reiterated here.

Based on the above, it should be readily apparent that the dish rack adjustment system of the invention accommodates vertical repositioning of a dish rack between at least upper and lower positions in an effective and reliable manner. In particular, it should be noted that the structure retaining the rack in the lowered position acts separate from the locking levers, while the locking levers include structure to release the rack for vertical movement. In addition, the locking levers themselves include additional structure to directly retain the rack in the raised position. In any case, although described with respect to preferred embodiments of the invention, it should be readily understood that various changes and/or modifications can be made to the invention without departing from the spirit thereof. For instance, although the invention is described for use on a wire dish rack, it should be recognized that the vertical adjustment system can be employed with various rack constructions, including molded racks, such as racks molded of plastic, with molding also being the preferred manner to establish each of the parts of the adjustment system. In general, the invention is only intended to be limited by the scope of the following claims.

What is claimed is:

1. A dishwasher comprising:
   a tub having at least bottom, rear and side walls that collectively define a washing chamber;
   a dish rack in the washing chamber; and
   a height adjustment system including first and second height adjustment mechanisms provided along side walls of the dish rack for vertically shifting the dish rack between lowered and raised positions relative to the tub, each of said first and second height adjustment mechanisms including:
   an adjuster arm fixed vertically relative to the tub, said adjuster arm including at least one locking opening;
   a locking strap secured to the rack, said locking strap including at least one locking tab adapted to be received in the at least one locking opening to prevent the rack from shifting vertically relative to the adjuster arm; and
   a locking lever mounted for pivotal movement relative to the rack, said locking lever including at least one wing member configured to engage the at least one locking tab to release the at least one locking tab from the at least one locking opening to permit vertical shifting of the rack upon pivoting of the locking lever relative to the rack.

2. The dishwasher according to claim 1, wherein the at least one wing member is interposed between the adjuster arm and the at least one locking tab.

3. The dishwasher according to claim 2, wherein the at least one locking tab is cantilevered from the locking strap and includes a catch member at a free, terminal end thereof, with the catch member being receivable in the at least one locking opening.

4. The dishwasher according to claim 2, wherein the at least one locking tab includes a pair of spaced locking tabs extending on either side of the locking lever.

5. The dishwasher according to claim 1, wherein the locking lever includes an upper portion, a lower portion and a central portion, with said upper portion including a pressing region and said locking lever being mounted for pivotal movement about the central portion.

6. The dishwasher according to claim 5, wherein the locking lever further includes a support member configured to engage the adjuster arm to support the rack in the raised position.

7. The dishwasher according to claim 6, wherein the support member is provided in the lower portion of the locking lever and below the at least one wing member.

8. The dishwasher according to claim 7, further comprising means for biasing the locking lever, wherein the biasing means maintains the support member in engagement with the adjuster arm when the rack is in the raised position.

9. The dishwasher according to claim 5, wherein the locking lever is directly pivotally mounted to the rack.

10. The dishwasher according to claim 1, wherein the adjuster arm is provided with fore-to-aft spaced guide pockets and the locking strap is provided with fore-to-aft spaced legs, with the legs being slidably received in the guide pockets for guiding movement of the rack between the lowered and raised positions.

11. The dishwasher according to claim 1, wherein the rack includes a plurality of spaced vertical wires connected to a plurality of spaced horizontal wires and wherein the adjuster arm includes a plurality of spaced channel defining members which slidably receive respective ones of the plurality of spaced vertical wires.

12. The dishwasher according to claim 1, wherein the locking strap is fixed to the rack such that the locking strap moves vertically with the rack as the rack is shifted.

13. A dishwasher comprising:
a tub having at least bottom, rear and side walls that collectively define a washing chamber;
a dish rack in the washing chamber, said dish rack including a plurality of spaced vertical wires connected to a plurality of spaced horizontal wires; and
a height adjustment system including first and second height adjustment mechanisms provided along side walls of the dish rack for vertically shifting the dish rack between lowered and raised positions relative to the tub, each of said first and second height adjustment mechanisms including:
an adjuster arm fixed vertically relative to the tub, said adjuster arm including a plurality of spaced channel defining members which slidably receive respective ones of the plurality of spaced vertical wires;
a locking strap secured to the rack;
fore-to-aft spaced guide pocket and leg assemblies interposed between the adjuster arm and the locking strap for guiding movement of the rack between the lowered and raised positions;
a locking member configured to interengage the adjuster arm and the locking strap in one of the lowered and raised positions; and
a locking lever, separate and distinct from the locking member, mounted for pivotal movement relative to the rack, said locking lever being configured to engage and shift the locking member to disengage the locking strap and the adjuster arm to permit vertical shifting of the rack.

14. The dishwasher according to claim 13, wherein the locking strap is fixed to the rack such that the locking strap moves vertically with the rack as the rack is shifted.

\* \* \* \* \*